3,177,726
CONDITION MEASURING SYSTEMS
Sterling Fisher, Sarasota, Fla., assignor to Electro-Mechanical Research, Inc., Sarasota, Fla., a corporation of Connecticut
Filed Aug. 28, 1962, Ser. No. 219,976
3 Claims. (Cl. 73—497)

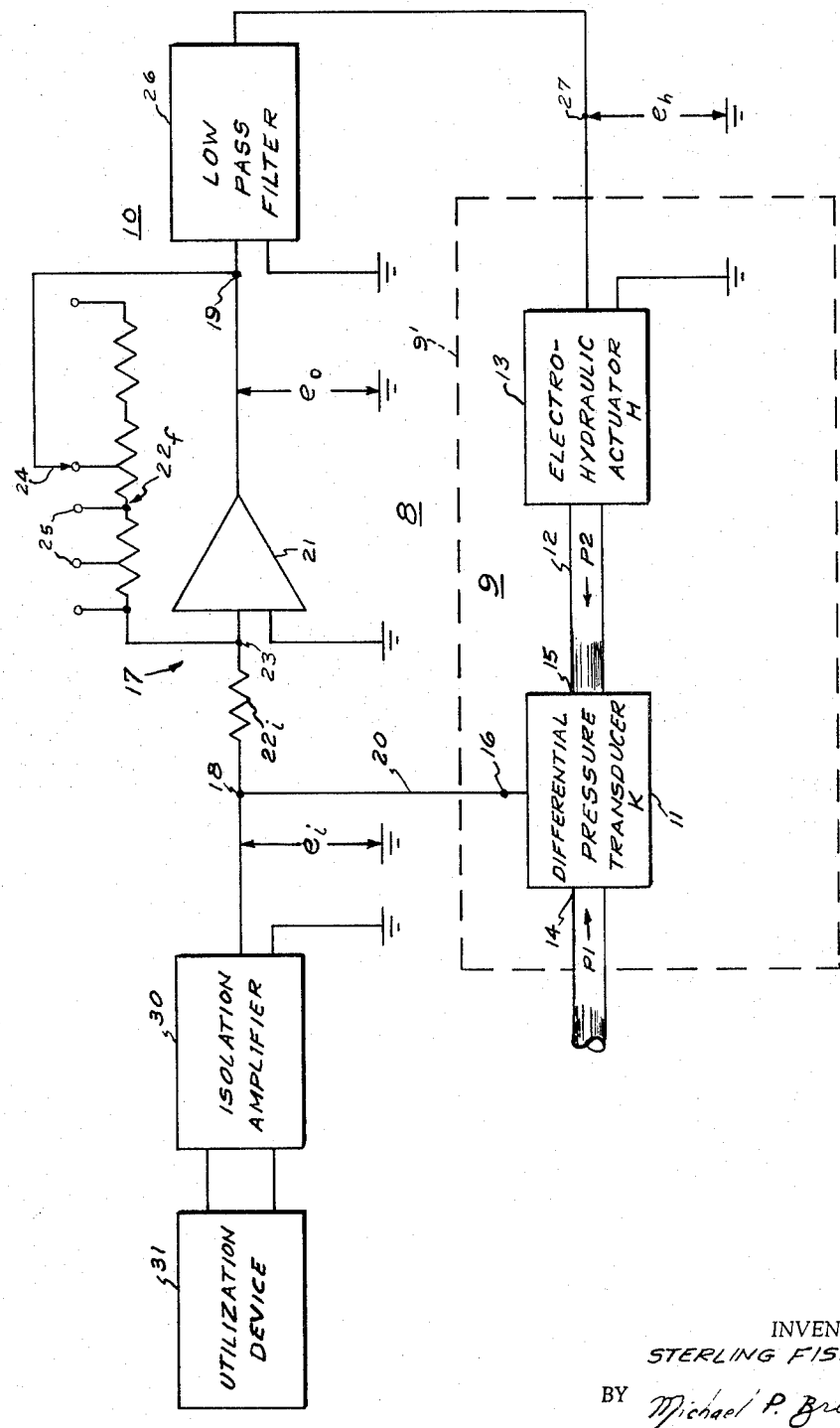

This invention relates generally to condition measuring systems and more particularly to wide-range condition measuring systems especially suitable for the measurement of pressures and the like.

Heretofore to measure the amplitude of a variable representing a condition, as temperature, pressure, force, etc., over an extended range of values, it was necessary to employ a plurality of transducers or meters having overlapping, full-scale ranges (FSR). The accuracy of a transducer is typically specified by its manufacturer as a percentage of its FSR. Therefore it is advantageous to employ a meter with as low a FSR as is conveniently possible. To illustrate, suppose a pressure $P=20$ p.s.i. is measured first with meter A having a FSR of 500 and then with meter B having a FSR of 25, each meter having a $\pm 1\%$-of-FSR accuracy. If meter A reads 20, then the true value is between 15 and 25 because $\pm 1\%$ of 500 is $\pm 5$. On the other hand, if meter B also reads 20, then the true value is between 19.75 and 20.25 because $\pm 1\%$ of 25 is $\pm 0.25$. Better-yet results would be obtained with meter C having a FSR of 20. Thus to measure increasing pressures, it is advantageous to correspondingly and gradually extend the FSR of the employed meter.

Another characteristic of meters is that, typically, they can withstand an overload of only about 50% to 100%. Hence for the sake of meter protection, the frequent replacement of meters is very advisable. While in many applications, as in the laboratory, the frequent changing of meters is not too objectionable, yet in other applications it is both too time-consuming and very expensive.

For instance, in oceanographic work it is often desired to measure the water's pressure near the surface as well as at greater depths. With known methods this could best be accomplished only by first lowering, up to a predetermined depth, the measuring equipment with a pressure transducer having a relatively low FSR, then raising the equipment to the surface, replacing the transducer with another transducer having a relatively higher FSR, again lowering the equipment to a relatively greater depth, raising it again, etc.

Consequently, it is a broad object of the present invention to provide relatively wide-range condition measuring systems in which the need for the frequent replacement of condition transducers is avoided.

It is another object of the present invention to provide wide-range condition measuring systems in which the full-scale range of the employed transducers can be easily, selectively, and remotely controlled.

It is a further object of the present invention to provide a closed-loop, wide-range condition measuring system particularly suitable for telemetering applications.

The above and other apparent objects of the present invention are accomplished by providing a closed-loop system for measuring an unknown variable over a relatively wide range, the system including a differential transducer having a first input, a second input, and an output. The unknown variable is applied to the first input; a controlled variable is applied to the second input; and the output provides an electric signal as a function of the difference between the magnitudes of the known and unknown variables. A high-gain amplifier, preferably having a feed-back network and an input network, receives said electric signal and provides an amplified version thereof to an electric actuator which supplies the controlled variable to the second input of the differential transducer. Thus the amplifier, the transducer, and the actuator form a closed-loop system in which, by selectively changing the gain of the amplifier network, the full-scale range of the differential transducer can be correspondingly extended from a relatively low range to be relatively high range. The amplifier's gain can be selectively changed in a variety of known manners, as by selecting the magnitude of a parameter in the amplifier's feed-back network.

The features of the invention which are believed to be novel are set forth with particularity in the appended claims. The invention itself, however, both as to its organization and mode of operation, together with further objects and advantages thereof, may best be understood by reference to the following description taken in conjunction with the accompanying drawings in which the single figure is a schematic, block diagram of a preferred measuring system incorporating the principles of the invention.

To illustrate the invention with reference to a typical application, assume that the unknown variable condition is pressure whose value $P_1$ varies with the depth of the ocean. Then the wide-range measuring system will include a closed loop, generally designated as 8, comprising a hydraulic unit 9 having a housing 9' represented by the dotted lines, and an electronic unit 10 kept typically at the ocean's surface as on a ship's board. In some applications, however, it may be advantageous to enclose the electronic unit 10 within the housing 9'.

Hydraulic unit 9 includes a differential pressure transducer (DPT) 11 coupled by a pressure-transmitting, hydraulic channel 12 to an electrohydraulic actuator (EHA) 13. The DPT 11 has a first liquid inlet port 14 and a second liquid inlet port 15. The DPT 11 may be any known type transducer having a transfer function $1/K$ relating the pressure differential $\Delta p$ between its inlet ports 14, 15 and the electric signal $e_i$ at its output terminal 16. Then K can be written as $$K = \frac{P_1 - P_2}{e_i} = \frac{\Delta P}{e_i} \qquad (1)$$

The electronic unit 10 includes amplifying network 17, preferably an operational amplifier, having an input terminal 18 and an output terminal 19. A conductor 20 connects the output terminal 16 of the DPT 11 with the input terminal 18. The operation amplifier 17 typically comprises a high-gain amplifier 21 having a feed-back network $22_f$ between its output terminal 19 and its input terminal 23, and an input network $22_i$ between terminals 18 and 23. For simplicity, the input network $22_i$ is represented as a resistor $R_i$ and the feed-back network $22_f$ as a potentiometer. The potentiometer has a sliding contact 24 which can be selectively positioned on one of a plurality of stationary contacts 25. Thus the actual magnitude of the resistance $R_f$ in the feed-back circuit between terminals 19 and 23 depends on the position of contact 24. If the gain of amplifier 21 is very high, then the gain A of the operational amplifier 17 is given by $$A = -\frac{e_o}{e_i} = -\frac{R_f}{R_i} \qquad (2)$$

where $e_o$ is the output voltage at output terminal 19 and $e_i$ is the input voltage applied to terminal 18, the voltage signals being measured with reference to ground.

To minimize the disturbing effects of fast transient signals upon the EHA 13 and to control the dynamic response of the closed loop 8, a loop network 26, typically a low-pass filter, may be coupled between the output terminal 19 and the input terminal 27 to the EHA 13. The low-pass filter 26 may be either of the passive or of the active type, as is well-known.

Let $e_h$ be the input signal applied to the input terminal 27 of the EHA 13 then, assuming low-pass filter 26 to be lossless within its pass-band, $$e_h = e_o = Ae_i \tag{3}$$

If H is the transfer function of the EHA 13, then its output pressure $P_2$ transmitted through channel 12 is given by $$P_2 = He_h = HAe_i \tag{4}$$

Substituting Equation 4 into Equation 1 and solving solving for $e_i$ yields, $$e_i = P_1 \frac{1}{K+HA} \tag{5}$$

where K and H are fixed constants dependent upon the physical and geometrical arrangement of the transducer 11 and of the actuator 13, respectively. Equation 5 may be rewritten for $P_1$ as $$P_1 = (K+HA)e_i \tag{6}$$

Let $E_{fs}$ be the full-scale, output signal of the DPT 11 corresponding to a maximum pressure $P_{1max}$ applied to the first inlet 14, then Equation 6 can be rewritten as $$P_{1max} = KE_{fs} + HAE_{fs} \tag{7}$$

In the right-hand side of Equation 7, the only variable is the gain A of the operational amplifier 17. Consequently the full-scale, output signal $E_{fs}$ can be made to correspond to any desired pressure $P_1$ simply by suitably selecting the value for the gain A of the operational amplifier 17. From Equation 2, it will be apparent that gain A can be selectively controlled simply by sliding contact 24 over the stationary contacts 25. Because the electronic unit 10 can be located, as previously mentioned, at a remote position, it will be readily apparent that the full-scale range of the differential pressure transducer 11 can be remotely controlled without necessitating the undesirable, frequently replacement of pressure transducers.

Although the above analytical exposition is self-explanatory, it may be helpful to illustrate the operation of the measuring system with a numerical example. Assume that the full-scale, output signal $E_{fs}$ of DPT 11 corresponds to a maximum pressure differential $\Delta P_{max} = 10$ p.s.i. and that $P_1 = 1000$ p.s.i. Then, the transfer function H of the EHA 13 and the gain A of the operational amplifier 17 are adjusted so that the EHA provides an output pressure $P_2 = 1000 - 10 = 990$ p.s.i. when an input signal $e_i = E_{fs}$ is applied to the input terminal 18 of the operational amplifier 17.

Suppose that it is now desired to measure instead of 1000 p.s.i. a maximum input pressure $P_1$ of 10,000 p.s.i. yet employing the same differential pressure transducer 11. Correspondingly, the output pressure $P_2$ of the EHA 13 must now be 9,990 p.s.i. when an input signal $e_i = E_{fs}$ volts is applied to the input terminal 18 of the operational amplifier 17. This can readily be accomplished by merely increasing the gain A of amplifier 17 by approximately a factor of ten.

Equation 6 shows that by measuring the amplitude of signal $e_i$ and by knowing the pre-set gain of the operational amplifier 17, one can readily arrive at the magnitude of the measured pressure $P_1$ remembering that K and H are constants of the system. It will be readily apparent, however, that the output signal can be derived from any point within the closed loop 8; for example, the magnitude of signal $e_i$ can be measured at the input terminal 18 to (or at the output terminal 19 of) the operational amplifier 17. Most conveniently, however, the output signal $e_i$ is first amplified by an isolation amplifier 30 and then applied to a suitable utilization device 31, such as a recorder, digital voltmeter, etc.

While the present invention has been described with reference to a particular embodiment thereof and to a particular application, it will be understood by men skilled in the art that various modifications may be made therein without departing from the spirit of the invention as defined in the appended claims. For instance, the measuring system may be readily modified to measure other variables than pressure. For example, if temperature were the measured variable, then the differential pressure transducer 11 would be replaced by a differential temperature transducer and the electrohydraulic actuator would be replaced by an electrothermic actuator. The differential temperature transducer would produce an output signal $e_i$ in response to a difference in temperature $\Delta T = T_1 - T_2$ and the electrothermic actuator would provide the offsetting temperature $T_2$ in response to an electric signal applied to its input terminal 27.

What is claimed is:
1. A system for accurately measuring an unknown pressure over an extended range of values, said system having a closed loop including a differential pressure transducer, a variable gain amplifier, a filtering network, and an electrohydraulic actuator arranged in cascade; said differential pressure transducer having a first input responsive to said unknown pressure, a second input responsive to the output pressure of said electrohydraulic actuator, and providing an electric signal to said amplifier dependent on the difference in pressure between said first and second inputs, the output pressure of said electrohydraulic actuator being dependent on the output signal of said amplifier, and the operating range of said transducer being selectively controllable by varying the gain of said amplifier.

2. A system for accurately measuring an unknown pressure over an extended range of values, said system including a differential pressure transducer having a first inlet responsive to the measured pressure, a second inlet, and an output providing a signal indicative of said unknown pressure; a variable gain amplifier accepting the output of said transducer and providing an amplified output signal, and means responsive to said amplified output signal for applying to said second inlet a substantial offsetting pressure whereby the difference between said measured and said offsetting pressures is selectively made to fall, by controlling the gain of said amplifier, within the range of values measurable by said transducer.

3. A system for accurately measuring an unknown pressure $P_1$ over a relatively wide range comprising in combination: a differential pressure transducer having a first inlet responsive to $P_1$ and a second inlet responsive to a controllable pressure $P_2$ whereby the difference in pressure $\Delta P$ between $P_1$ and $P_2$ falls within the range of values measurable by said transducer, said transducer providing an output electric signal as a function of $\Delta P$; a variable gain amplifier for amplifying the output of said transducer, an electrohydraulic actuator for providing said pressure $P_2$ in response to the output of said amplifier, means coupling said transducer, said amplifier, and said actuator to form at least one closed servoloop, and a utilization device coupled to said loop for providing an indication of the value of said measured pressure.

References Cited by the Examiner

Andrews: "ABC's of Synchros and Servos," page 11, May 1962, Howard W. Sams & Co., Inc.

RICHARD C. QUEISSER, *Primary Examiner.*

JOSEPH P. STRIZAK, *Examiner.*